United States Patent
Le Quere

(10) Patent No.: US 8,844,980 B2
(45) Date of Patent: Sep. 30, 2014

(54) DEVICE FOR COUPLING A TUBE TO A CIRCUIT ELEMENT, METHOD FOR MOUNTING AN ANCHORING RING ON A BODY OF SUCH A COUPLING DEVICE AND METHOD FOR DISMANTLING SUCH A DEVICE

(75) Inventor: Philippe Le Quere, Betton (FR)

(73) Assignee: Parker Hannifin Manufacturing France SAS, Annemasse (FR)

( * ) Notice: Subject to any disclaimer, the term of this patent is extended or adjusted under 35 U.S.C. 154(b) by 0 days.

(21) Appl. No.: 13/641,263

(22) PCT Filed: Apr. 13, 2011

(86) PCT No.: PCT/EP2011/055860
§ 371 (c)(1), (2), (4) Date: Dec. 24, 2012

(87) PCT Pub. No.: WO2011/128390
PCT Pub. Date: Oct. 20, 2011

(65) Prior Publication Data
US 2013/0106104 A1     May 2, 2013

(30) Foreign Application Priority Data

Apr. 13, 2010   (FR) ..................... 10 52813

(51) Int. Cl.
*F16L 19/08*    (2006.01)
*F16L 37/091*    (2006.01)
(52) U.S. Cl.
CPC ..................... *F16L 37/091* (2013.01)
USPC ......................... 285/340; 285/316

(58) Field of Classification Search
USPC ................. 285/340, 319, 321, 314, 315, 316
See application file for complete search history.

(56) References Cited

U.S. PATENT DOCUMENTS

| 4,645,246 | A | * | 2/1987 | Guest ............................. 285/323 |
| 4,747,626 | A | * | 5/1988 | Hama et al. ................... 285/340 |
| 4,919,457 | A | * | 4/1990 | Moretti ......................... 285/340 |
| 5,487,572 | A | * | 1/1996 | Combot-Courrau et al. . 285/340 |
| 5,779,284 | A | * | 7/1998 | Guest ............................ 285/340 |
| 5,911,443 | A | * | 6/1999 | Le Quere ...................... 285/340 |
| 5,975,591 | A | * | 11/1999 | Guest ........................... 285/340 |

(Continued)

FOREIGN PATENT DOCUMENTS

| EP | 1591709 | 11/2005 |
| FR | 2873185 | 1/2006 |
| FR | 2876613 | 4/2006 |

OTHER PUBLICATIONS

International Search Report for corresponding patent application No. PCT/EP2011/055860 dated Jul. 28, 2011.

*Primary Examiner* — David E Bochna
(74) *Attorney, Agent, or Firm* — Renner, Otto, Boisselle & Sklar, LLP

(57) ABSTRACT

Device for connecting a tube to a circuit element, including a cartridge type tubular body provided externally with a washer for anchoring the body in a well of the circuit element and provided internally with a retainer for the tube, characterized in that the anchor washer is mounted on an end portion of the tubular body designed to lie at the level of the opening of the well when the connecting device is in use, the end portion being elastically deformable between a deformed state enabling the washer to be placed on the body and a rest state for retaining the washer on the body.

9 Claims, 2 Drawing Sheets

(56) References Cited

U.S. PATENT DOCUMENTS

| | | | |
|---|---|---|---|
| 6,145,887 A * | 11/2000 | Cambot-Courrau | 285/340 |
| 6,173,999 B1 * | 1/2001 | Guest | 285/340 |
| 6,183,022 B1 * | 2/2001 | Guest | 285/340 |
| 6,312,019 B1 * | 11/2001 | Nakazumi et al. | 285/340 |
| 6,612,623 B2 * | 9/2003 | Salomon-Bahls | 285/340 |
| 7,448,654 B2 * | 11/2008 | Le Quere | 285/319 |
| 7,621,569 B2 * | 11/2009 | Anthoine | 285/340 |
| 8,491,012 B2 * | 7/2013 | LeQuere | 285/340 |
| 2004/0245766 A1 * | 12/2004 | Vallee | 285/340 |

\* cited by examiner

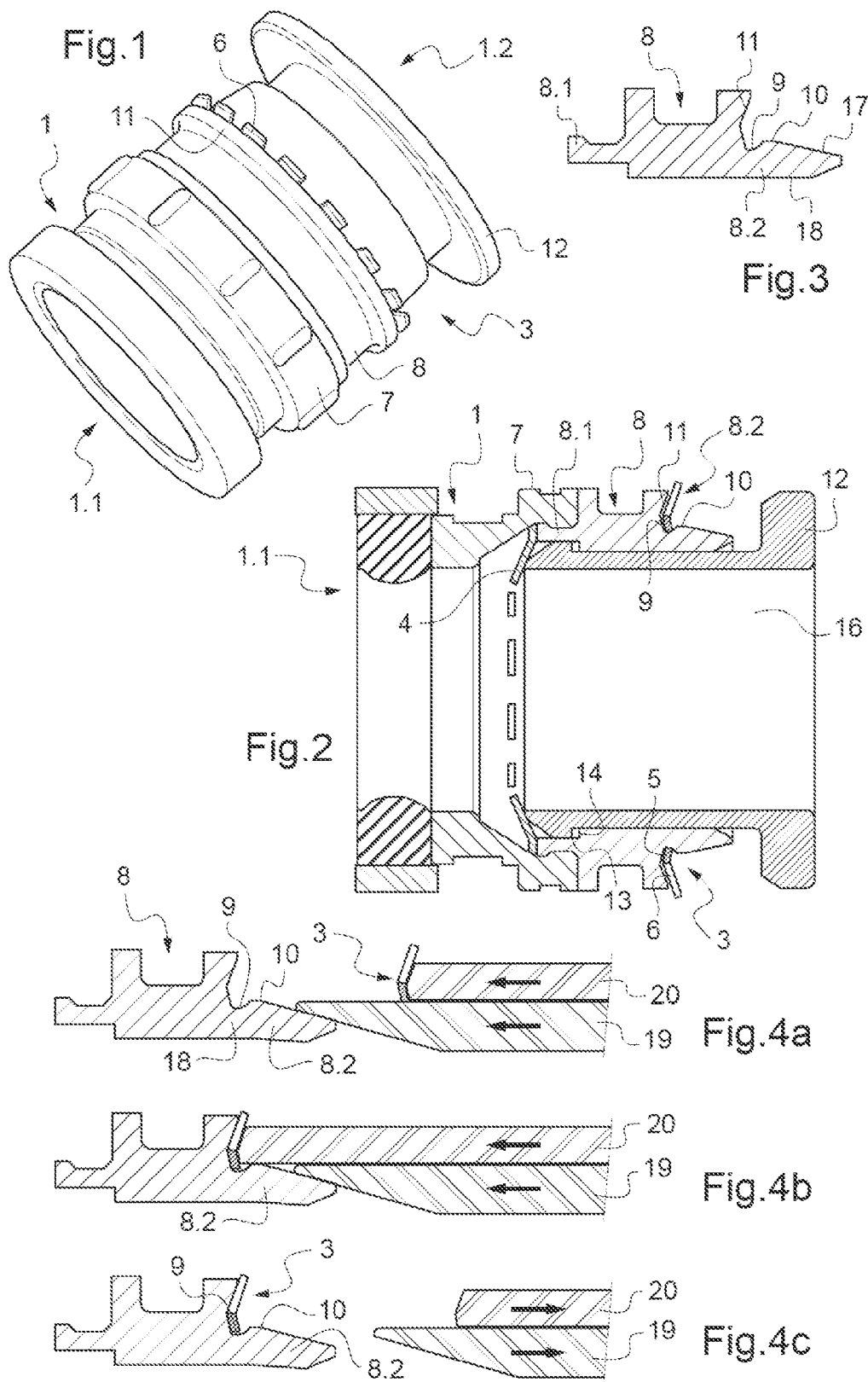

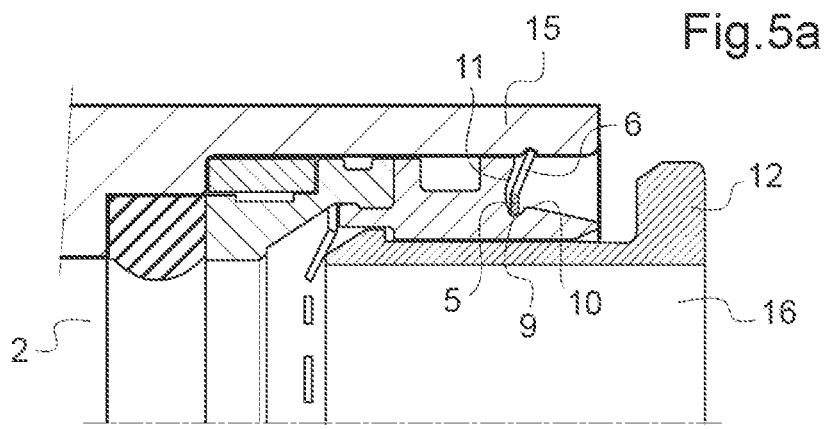
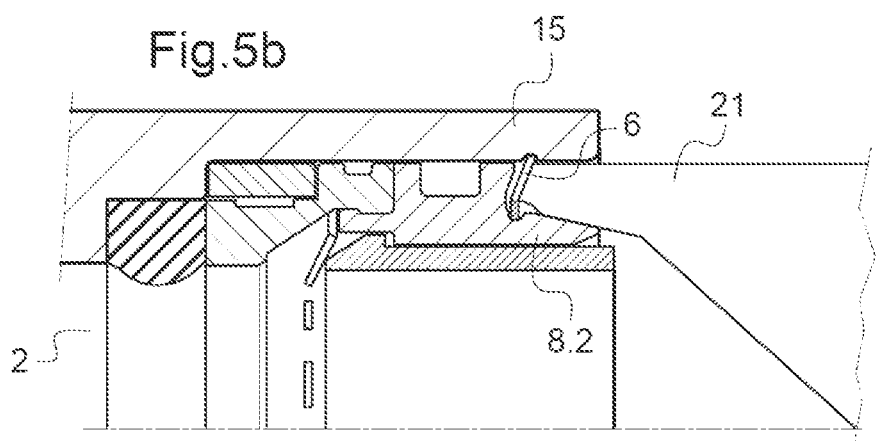
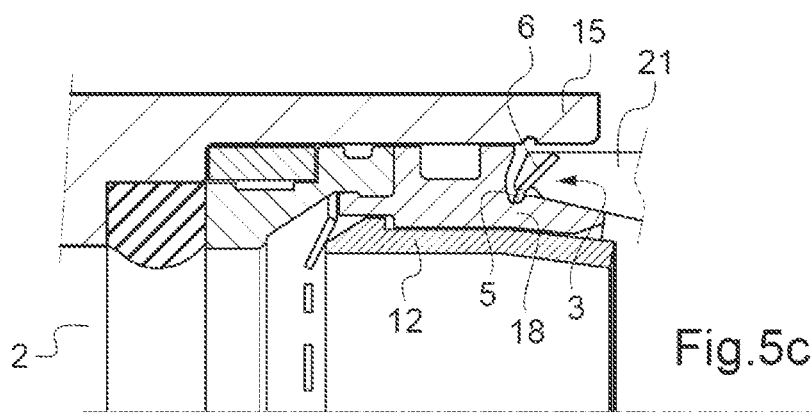

DEVICE FOR COUPLING A TUBE TO A CIRCUIT ELEMENT, METHOD FOR MOUNTING AN ANCHORING RING ON A BODY OF SUCH A COUPLING DEVICE AND METHOD FOR DISMANTLING SUCH A DEVICE

The present invention concerns a device for connecting a tube to a fluid transport circuit element, such as a fluid sender or receiver element such as a pump, a distributor, an actuator, a tank, a flow regulator or pressure regulator, etc. The invention also relates to a method of mounting an anchor washer on a body of such a connecting device and a method of demounting such a device.

BACKGROUND OF THE INVENTION

Connecting devices of cartridge type designed to be engaged in a passage of a circuit element to connect a tube or pipe to said passage of the circuit element are known. One such device includes a tubular body provided internally with means for attaching the tube and provided externally with anchor means including inclined elastically deformable teeth to oppose extraction of the cartridge from its housing. The teeth are fastened to the end of the body farthest from the opening of the passage when the device is in place therein. Seals are moreover fixed to the body of the cartridge to seal the connection once the cartridge has been inserted into the passage of the circuit element and a tube has been engaged in the device.

During insertion of the device into the passage, the teeth are deformed and rub against the walls of the passage until the device reaches its final position in the passage. Insertion of the connecting device therefore requires a high force to be applied for a relatively long time. What is more, this force must be exerted immediately insertion of the body into the passage begins, at a time when the length guiding the body in the passage is short, with the result that the body may be introduced with a skew if the force is not exerted perfectly on the axis. Moreover, the teeth scratch the wall of the passage during insertion of the device into the passage and therefore cause deterioration of the surface state thereof. This deterioration of the surface state of the passage degrades the quality of the contact of the seal with the wall of the passage leading to a risk of leaks. This may also cause the seal to deteriorate by rubbing on the wall of the passage previously degraded by the teeth.

Once the device is in place, it can no longer be removed unless sufficient traction is exerted on the device to tear the device out, since the position of the anchoring means provides no access thereto, the seal obstructing access to the teeth.

Devices have been envisaged in which the anchor washer is positioned so as to lie in the vicinity of the opening when the device is in place in the well of the circuit element. The anchor washer then includes a tubular internal portion mounted tightly on the body of the connecting device or immobilized axially by an attached member.

OBJECT OF THE INVENTION

The object of the invention is thus to propose a device for connecting a tube to a circuit element that has a simple structure and enables facilitated fitting.

SUMMARY OF THE INVENTION

To this end, a first object of the invention is a device for connecting a tube to a circuit element, including a cartridge type tubular body provided externally with a washer for anchoring the body in a well of the circuit element and provided internally with means for retaining the tube. The anchor washer is mounted on an end portion of the tubular body designed to lie at the level of the opening of the well when the connecting device is in use, the end portion being elastically deformable between a deformed state enabling the washer to be placed on the body and a rest state for retaining the washer on the body.

The anchor washer disposed in this way then comes to be anchored in the wall of the well at the level of the opening of the well allowing insertion of the tubular body into the well in a way that limits the deterioration of the wall of the well and the force necessary for inserting the device in the well. Such an arrangement also allows access to the anchor washer via the opening of the well. Placing the washer in its housing and extracting it therefrom are facilitated. The anchor washer may furthermore have a standard structure given the low forces necessary for positioning it.

The invention also consists in a method of mounting the anchor washer on the body of the connecting device of the invention and a method of demounting a device of the above type.

Such a method thus enables the device to be extracted easily from the well.

BRIEF DESCRIPTION OF THE DRAWINGS

Other features and advantages of the invention will become apparent on reading the following description of particular embodiments of the invention given with reference to the appended figures, in which:

FIG. 1 is a perspective view of a tubular body of the invention;

FIG. 2 is a view in section of the device before its insertion in a well;

FIG. 3 is a half-view in section of a part of the tubular body;

FIGS. 4a, 4b and 4c are half-views in section showing diagrammatically the steps of mounting an anchor washer on the tubular body;

FIGS. 5a, 5b and 5c are half-views in section showing diagrammatically the steps of demounting the anchor washer.

DETAILED DESCRIPTION OF THE INVENTION

The figures represent a tubular body 1, or cartridge, designed to be inserted in a well 2 of a circuit element via an opening 16 of the well 2. The cartridge 1 includes on its exterior wall an anchor washer 3 and on its interior wall means for retaining a tube, the tube not being shown. The cartridge 1 has a first end 1.1 through which the body is engaged in the well 2 and a second end 1.2 intended to lie in the vicinity of the opening 16 when the cartridge is in the well 2.

The anchor washer 3 is composed of an annular internal part 5 from which extend teeth 6 inclined relative to a central axis of the annular part 5 and directed toward the opening 16 intended to receive the tube to be connected. Here the annular internal part 5 has a rectangular cross section with a major axis extending in a direction substantially perpendicular to the central axis of the washer. The anchor washer 3 is disposed at the end 1.2 of the cartridge. In a preferred embodiment, the annular part 5 is deformable in torsion and the teeth are relatively rigid.

The cartridge 1 is composed of two parts, namely a seal support bush 7 to one end of which is clipped one end 8.1 of an insert 8.

The bush 7 and the insert 8 define between them an internal groove for receiving a washer 4 forming the means for retaining the tube.

The insert 8 has an end portion 8.2 opposite the end 8.1 that is provided externally with a receiving groove 9 delimited laterally by flanks 10 and 11. The flank 10 is formed by a small rim that has a height sufficient to constitute an abutment against tearing out of the anchor washer 3 and that is connected to the end face of the end portion 8.2 by a frustoconical surface 17 reducing in size toward the end face. The flank 11 has a shape substantially complementary to that of the anchor washer 3 and includes two frustoconical surfaces forming a concave dihedron. The external frustoconical surface is such that the inclined teeth come to bear on it, the teeth extending radially outward beyond the insert 8 to be anchored into the wall 15 of the well 2. The width of the receiving groove 9 is advantageously greater than the thickness of the annular part 5 of the anchor washer 3.

In a preferred embodiment the end portion 8.2 receives, in a manner known in itself, a sliding tubular disconnection member 12, such as a plunger, extending from the exterior of the cartridge 1, via a maneuvering end, as far as the attachment washer 4, through a nose adapted to raise the teeth of said attachment washer 4 when the plunger 12 is pushed in. The plunger 12 and the insert 8 are provided with complementary abutments 13, 14 disposed facing each other to oppose removal of the plunger 12.

The cartridge 1 is mounted in the well 2 in the classic manner. The inclination of the teeth 6 facilitated by the width of the receiving groove 9 allows free torsion of the annular part 5. Once the cartridge 1 has been inserted, the teeth 6 are anchored into the wall 15 of the well 2.

It will be noted that the position of the anchor washer 3 at the end 1.2 of the cartridge 1 on the one hand enables the rubbing of the teeth 6 on the wall 15 of the well 2 during insertion of the cartridge 1 into the well 2 to be limited and on the other hand renders the anchor washer 3 accessible to a person skilled in the art.

The tube is connected in the classic manner to the cartridge 1 and disconnection of the tube is possible by pushing in the plunger 12.

FIGS. 4a, 4b and 4c illustrate the mounting of the washer 3 on the insert 8.

FIG. 4a shows the first step enabling placing of the washer 3 in the groove 9. When the insert 8 is at rest, not deformed, insertion of the washer 3 as far as the groove 9 is not possible because of the radius defined by the abutment 10, which is greater than that of the washer 3. Consequently, a tool 19 is used to exert pressure on the frustoconical surface 17, thereby deforming the insert 8 at the level of the neck 18. The radius defined by the abutment 10 is then smaller than that of the washer 3.

FIG. 4b illustrates the placing of the washer 3 in the groove 9. With the tool 19 holding the insert 8 in its deformed state, a second tool 20, disposed on the tool 19 to slide thereon, positions the washer 3 in the receiving groove 9.

Once the washer 3 is in place, the tools 19 and 20 are withdrawn, as shown in FIG. 4c, and the abutment 10 then traps the washer 3 in the receiving groove 9.

Alternatively, the tool 19 need not be involved in fitting the washer 3. The positioning of the washer 3 in the groove 9 will advantageously be effected with the aid of the tool 19 when the annular part 5 of the anchor washer 3 is of small section and the latter washer is liable to be damaged when fitting it.

The insert 8 is made from an elastic material. The receiving groove 9 and the internal wall of the insert 8 define a neck 18 allowing deformation of the end portion 8.2 of the insert 8 to enable the anchor washer 3 to pass.

The plunger 12 is then fitted.

FIGS. 5a, 5b and 5c illustrate the demounting of the anchor washer 3.

FIG. 5a shows a part of the connecting device of the invention in which the teeth 6 of the washer 3 are anchored in the wall 15 and the annular part 5 of the anchor washer 3 is trapped in the groove 9 by the abutment 10.

After cutting off the maneuvering end of the plunger 12, the end 21 of a pair of pliers is introduced between two teeth 6 of the anchor washer 3. The ends of the pliers 21 then bear on the upper flank of the annular part 5 of the washer as shown in FIG. 5b.

Accordingly, by operating the pliers 21, the annular part 5, the neck 18 of the washer 3 and the wall of the plunger 12 are deformed, allowing disengagement of the teeth 6 by tilting of the annular part 5 and extraction of the anchor washer 3 by virtue of the reduced size of the end portion 8.2 (see FIG. 5c).

The operations shown in FIGS. 5b and 5c may be repeated if necessary until the anchor washer 3 is extracted completely.

Of course, the invention is not limited to the embodiment described above and lends itself to variants that will be apparent to the person skilled in the art without departing from the scope of the invention as defined by the claims.

In particular, although the washer shown is composed of an annular part flexible in torsion and rigid teeth, it is possible to provide flexible teeth that are braced when the cartridge is subject to a force extracting it from the well.

Similarly, although the cartridge is shown as a bush 7 extended by an insert 8, the cartridge may be produced in one piece.

Although the retaining means described comprise an attachment washer, other retaining means may be envisaged, such as a clamp provided with elastically deformable arms or a radially mobile lock.

Finally, although the disconnection member 12 enabling the teeth of the attachment washer 4 to be raised is represented here by a plunger, it does not go against the invention to substitute for this arrangement a different disconnection member 12 having the same function, such as the tubular disconnection sleeve extending, externally of the body, a clamp forming the means for retaining the tube.

The invention claimed is:

1. A device for connecting a tube to a circuit element, including a cartridge type tubular body provided externally with a washer for anchoring the body in a well of the circuit element and provided internally with a retainer for retaining the tube, wherein the anchor washer is mounted on an end portion of the tubular body designed to lie at the level of the opening of the well when the connecting device is in use, the end portion being elastically deformable between a deformed state enabling the washer to be placed on the body and a rest state for retaining the washer on the body, wherein said end portion of the tubular body includes a groove for receiving the anchor washer, and a frustoconical surface extends from an end face of the end portion as far as the groove, widening toward the latter.

2. The device according to claim 1, wherein the end portion of the tubular body receives a sliding disconnection member that can cooperate with the retainer to bring the retainer into a state releasing the tube, the end portion being adapted so that in its rest state the end portion receives the sliding disconnection member with a radial clearance.

3. The device according to claim 1, wherein the tubular body includes a main body provided with a sealing member, and the retainer includes an attachment washer trapped between the main body and the end portion.

4. The device according to claim 1, wherein the tubular body includes an external annular shoulder offering a bearing surface to the anchor washer on a side of the washer that is disposed opposite the opening of the well when in use and having an external circumference radially outwardly spaced from an external circumference of the washer.

5. The device according to claim 1, wherein the external annular shoulder has a shape substantially complementary to the anchor washer.

6. A method of mounting an anchor washer on a tubular body of a connecting device according to claim 1, including the steps of bringing an end portion of the tubular body to a state of elastic deformation and engaging the anchor washer over said end portion.

7. A method according to claim 6, wherein the state of elastic deformation is brought about by a first tool exerting pressure on the end portion, after which the washer is engaged over the end portion by a second tool of complementary shape to the washer and disposed on the first tool to slide thereon.

8. A method of demounting a device according to claim 1, for connecting a tube to a circuit element, wherein the method includes the step of introducing a tool into the opening of the well so as to reduce the size of the end portion of the tubular body and enable disengagement of the anchor washer.

9. A method according to claim 8, wherein the tubular body has movable therein a disconnection member with a manoeuvring end projecting axially and radially from the tubular body, and the method includes a preliminary step of cutting off said manoeuvring end.

* * * * *